(12) United States Patent
Bloch et al.

(10) Patent No.: US 8,805,575 B1
(45) Date of Patent: Aug. 12, 2014

(54) METHODS AND APPARATUS FOR DELIVERING FASTENERS

(75) Inventors: Daniel David Bloch, St. Peters, MO (US); Robert E. Bender, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 474 days.

(21) Appl. No.: 13/180,019

(22) Filed: Jul. 11, 2011

(51) Int. Cl.
*G06F 7/00* (2006.01)

(52) U.S. Cl.
USPC ......... 700/219; 29/812.5; 29/709; 29/525.01; 29/407.1; 221/1; 221/13; 221/278; 221/165; 227/112

(58) Field of Classification Search
USPC .......................................................... 700/219
See application file for complete search history.

(56) References Cited

U.S. PATENT DOCUMENTS

| | | | | |
|---|---|---|---|---|
| 2,754,860 | A | * | 7/1956 | Moore et al. ..................... 81/430 |
| 3,946,926 | A | * | 3/1976 | Willis ........................... 227/112 |
| 4,501,380 | A | | 2/1985 | Welch |
| 4,747,294 | A | * | 5/1988 | Schwartz et al. ............. 29/812.5 |
| 4,823,396 | A | | 4/1989 | Thompson |
| 4,828,159 | A | | 5/1989 | Woods |
| 4,877,138 | A | | 10/1989 | Motiwala |
| 5,009,354 | A | * | 4/1991 | D'Aquila et al. ................. 227/2 |
| 5,011,339 | A | * | 4/1991 | Aurtoi et al. ................... 406/191 |
| 5,014,876 | A | * | 5/1991 | Young et al. ................... 221/233 |
| 5,110,029 | A | * | 5/1992 | Blake ............................. 227/112 |
| 5,150,623 | A | | 9/1992 | Woods |
| 5,465,868 | A | * | 11/1995 | Bonomi ........................ 221/165 |
| 5,480,087 | A | * | 1/1996 | Young et al. ................... 227/112 |
| 5,588,554 | A | | 12/1996 | Jones |
| 5,727,300 | A | | 3/1998 | Ekdahl et al. |
| 6,000,596 | A | * | 12/1999 | Cariati ........................... 227/112 |
| 6,196,414 | B1 | * | 3/2001 | Ferenczi et al. ............... 221/123 |
| 6,264,063 | B1 | * | 7/2001 | Turner et al. .................. 221/278 |
| 6,510,675 | B1 | * | 1/2003 | Strassler ......................... 53/490 |
| 6,511,061 | B1 | * | 1/2003 | Ferenczi et al. ............... 271/123 |
| 6,565,496 | B1 | * | 5/2003 | LaPlante et al. .................. 483/1 |
| 6,575,347 | B2 | * | 6/2003 | Coonrod et al. .............. 227/112 |
| 6,688,489 | B2 | * | 2/2004 | Bloch et al. ..................... 221/88 |
| 6,772,508 | B2 | * | 8/2004 | Bloch et al. ..................... 29/709 |
| 6,832,431 | B2 | * | 12/2004 | Bloch et al. ................. 29/525.01 |
| 6,854,178 | B2 | | 2/2005 | Fritsche et al. |
| 6,941,627 | B2 | | 9/2005 | Fritsche et al. |
| 6,949,057 | B2 | | 9/2005 | Everson et al. |
| 6,951,298 | B1 | * | 10/2005 | Cogley et al. ................. 227/147 |
| 6,959,835 | B2 | * | 11/2005 | Bloch et al. ................... 221/278 |
| 7,003,860 | B2 | * | 2/2006 | Bloch et al. .................. 29/407.1 |
| 7,040,506 | B2 | * | 5/2006 | Bloch et al. ................... 221/278 |
| 7,232,273 | B2 | | 6/2007 | Nealon et al. |
| 2003/0034355 | A1 | * | 2/2003 | Bloch et al. ..................... 221/13 |
| 2005/0006427 | A1 | * | 1/2005 | Bloch et al. ................... 227/112 |
| 2005/0049126 | A1 | | 3/2005 | Everson et al. |
| 2005/0242106 | A1 | * | 11/2005 | Bloch et al. ....................... 221/1 |
| 2006/0226194 | A1 | * | 10/2006 | Bradbury et al. ............. 227/119 |
| 2007/0084039 | A1 | * | 4/2007 | Bloch et al. ................. 29/525.01 |

\* cited by examiner

*Primary Examiner* — Gene Crawford
*Assistant Examiner* — Kyle Logan
(74) *Attorney, Agent, or Firm* — Armstrong Teasdale LLP (57) ABSTRACT

A method for delivering fasteners to a remote installation tool is provided. The method includes delivering a first fastener of a first type to a remote installation tool in response to receiving a request for a fastener of the first type from an operator and staging a second fastener of the first type for delivery to the remote installation tool. The staging begins prior to receiving a request for another fastener of the first type from the operator. The staging includes retrieving the second fastener of the first type from a storage location and transferring the second fastener of the first type from the storage location to a staging location.

20 Claims, 6 Drawing Sheets

METHODS AND APPARATUS FOR DELIVERING FASTENERS

BACKGROUND

The field of the disclosure relates generally to automated fastener delivery equipment, and more specifically, to methods and apparatus for fastener staging in automated fastener delivery equipment.

In the production assembly of aircraft, the majority of substructure such as fuselage frames and longerons, along with wing spars and ribs, are joined to the skin of the aircraft with thousands of fasteners. Further, a plurality of fastener types, along with variations in diameters and grip lengths, are typically used in an aircraft assembly or subassembly. Generally, a fastener grip length refers to the cumulative thickness of the parts that the fastener holds together.

Automated fastener delivery systems that automatically deliver fasteners to a workpiece, or a fastening device, have been employed in various ways to simplify the fastener retrieval process in various types of automated fastener installation systems. Some of these known automated fastener delivery systems involve various types of storage devices and vibratory feed bowls that utilize different types of escapements for feeding fasteners through a tube to different types of fastening devices. Such known fastener delivery systems are typically employed in high rate production environments that have relatively large assembly systems permanently installed at a fixed location within a production facility. The equipment generally comprises a storage device for the fasteners and a mechanism or system that retrieves fasteners from the storage device and transports the fasteners to the workpiece or fastening device.

In at least one known fastener delivery system, fastener storage cassettes are utilized to cache the fasteners before delivery to a fastener installation device or the like with pressurized air. Typically, the fastener cassettes comprise at least one tube in which the fasteners are stacked longitudinally end to end. The fastener cartridges are filled off line either by hand or automatically. The fastener delivery system may be connected to more than one fastener installation device and may be used by more than one operator. When a fastener is requested by an operator, the appropriate fastener is removed from the proper storage tube, transferred to a drop point, and delivered through a passageway connecting the drop point to that operator's location and/or fastener installation tool. An operator may have to wait for the requested fastener to be removed from the cassette, transferred to the drop point and delivered through the passageway. This wait may be extended if the fastener delivery system is already retrieving a fastener for another operator. Because some assembly procedures may require hundreds of fasteners for each operator, this delay in receiving a requested fastener may amount to a significant amount of time.

Accordingly, a need remains in the art for an automated fastener delivery system that delivers fasteners to at least one work station or tool in a timely manner.

BRIEF DESCRIPTION

A method for delivering fasteners to a remote installation tool is provided. The method includes delivering a first fastener of a first type to a remote installation tool in response to receiving a request for a fastener of the first type from an operator and staging a second fastener of the first type for delivery to the remote installation tool. The staging begins prior to receiving a request for another fastener of the first type from the operator. The staging includes retrieving the second fastener of the first type from a storage location and transferring the second fastener of the first type from the storage location to a staging location.

In another aspect, an apparatus for delivering fasteners to a remote installation tool is provided. The apparatus includes a delivery tube for coupling to a remote installation tool, a delivery guide coupled to the delivery tube, an extraction device operable to transfer fasteners from the storage location to the delivery guide, and a staging mechanism coupled to the delivery guide. The staging mechanism is configured to selectively retain a fastener in the delivery guide or permit a fastener to pass through the delivery guide to the delivery tube.

In still another aspect, fastener delivery and installation system includes a storage system for storing a plurality of fasteners, an extractor for extracting a fastener of the plurality of fasteners from the storage location, and a delivery system. The delivery system includes a delivery guide for receiving fasteners from the extractor, a delivery tube coupled to the delivery guide, and a staging mechanism coupled to the delivery guide. The delivery tube is configured for coupling to a remote installation tool to deliver fasteners to the remote installation tool. The staging mechanism is configured to selectively retain a fastener in the delivery guide or permit a fastener to pass through the delivery guide to the delivery tube.

DETAILED DESCRIPTION

The following description of the preferred embodiments is merely exemplary in nature and is in no way intended to limit the described embodiments, their application, or uses.

Figure 1:
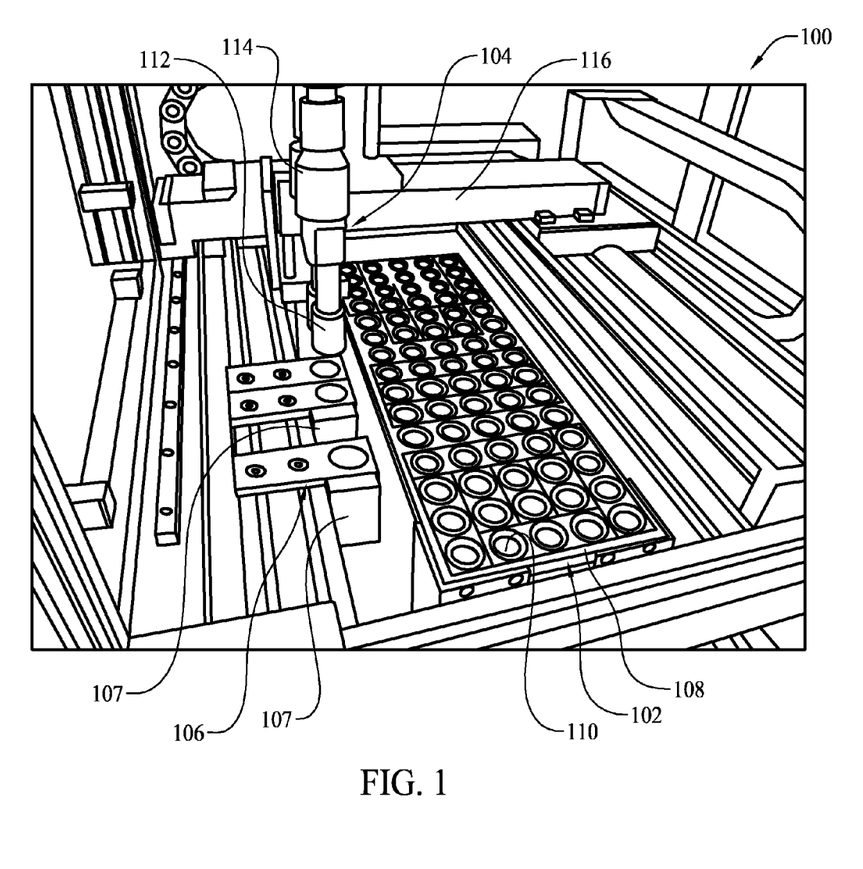
FIG. 1 is an illustration of a portion of an exemplary fastener delivery system.

Referring to the drawings, an exemplary fastener delivery system, generally referred to by reference numeral 100, is illustrated in FIG. 1. Fastener delivery system 100 includes a storage system 102 for storing fasteners and an extractor system 104 for retrieving fasteners from storage system 102. A delivery subsystem 106 receives fasteners from extractor system 104 and delivers them to an operator's location. A plurality of staging mechanisms 107 are coupled to the delivery subsystem to stage fasteners for delivery to an operator.

Storage system 102 includes a fastener cassette 108 having a plurality of storage tubes 110. Each fastener storage tube 110 houses a specific fastener configuration, i.e. type, diameter, and grip length, etc. Fasteners rest within fastener storage tubes 110. Accordingly, the diameter of each fastener storage tube 110 may be sized appropriately to prevent tumbling of the fasteners and to allow for ease of loading, either manually or automatically, of the fasteners within the fastener storage tube 110.

Fastener cassette 108 may comprise a plurality of fastener storage tubes 110 having different diameters to accommodate a variety of different fastener configurations. As shown in FIG. 1, the fastener cassette 108 is capable of housing up to seventy-five variations of fastener type, diameter, and grip length with the use of seventy-five fastener storage tubes 110. In other embodiments, fastener cassette 108 may include more or fewer storage tubes 110 and/or fastener storage tubes 110 may be arranged in a different configuration.

Fastener delivery system 100 is not limited to a single fastener cassette 108. In other embodiments, the fastener delivery system 100 may include a plurality (not shown) of fastener cassettes 108 according to specific application requirements.

The extractor system 104 generally includes an extractor tool 112. A vacuum generator 114 is disposed at an upper end of the extractor tool 112. Vacuum generator 114 is utilized to generate vacuum pressure for removing fasteners from storage system 102 and holding the fasteners while transporting the fasteners to delivery subsystem 106.

Generally, extractor system 104 is positioned proximate storage system 102 using a linear X-Y positioner 116 that is activated by the control system (not shown). More specifically, the linear X-Y positioner 116 positions extractor tool 112 adjacent the appropriate fastener storage tube 110 that contains the requested fastener. Accordingly, the X and Y position of each fastener storage tube 110 is stored within the control system as described in greater detail below.

In operation, the control system activates the linear X-Y positioner 116 to position extractor system 104 adjacent storage system 102, and more specifically, to position an extractor tool 112 adjacent the appropriate fastener storage tube 110. Once the extractor tool 112 is positioned adjacent the appropriate fastener storage tube 110, the extractor tool 112 is moved in the vertical direction until it abuts fastener cassette 108, which provides substantially sealed communication between fastener storage tube 110 and the extractor tool 112 when the vacuum generator 114 is activated to remove a fastener.

Once the extractor tool 112 is positioned against fastener cassette 108 above the appropriate fastener storage tube 110, vacuum generator 114 is activated. Fasteners in the appropriate fastener storage tube 110 rise toward extractor tool 112 and a fastener is captured by extractor tool 112. The captured fastener may then be transferred by extractor system 104 to delivery subsystem 106.

Figure 2:
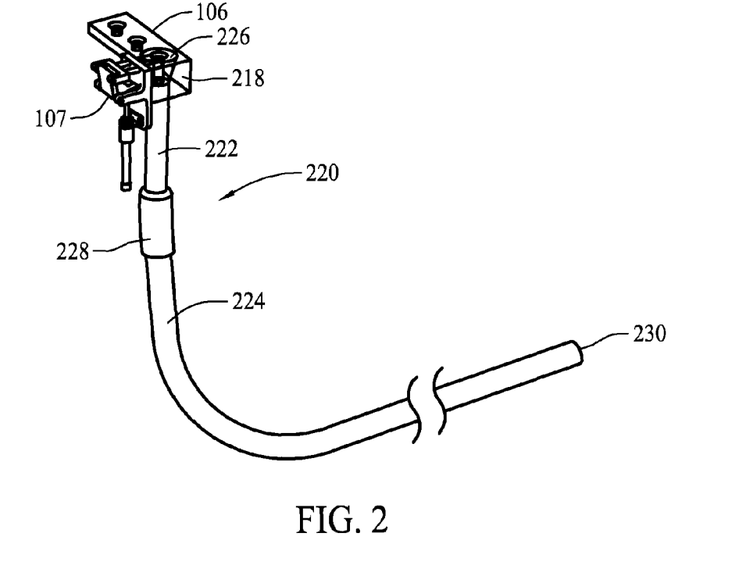
FIG. 2 is an illustration of a portion of a delivery subsystem and a staging mechanism for use in the fastener delivery system shown in FIG. 1.

FIG. 2 is an illustration of a portion of delivery subsystem 106 and staging mechanism 107. A delivery guide 218 is coupled in communication with a delivery tube 220. Delivery tube 220 includes a fixed fastener delivery tube 222 and a flexible fastener delivery tube 224. Delivery guide 218 defines a chute 226, through which fasteners are dropped. Preferably, the chutes 226 are tapered, although a variety of shapes may be employed to effectuate transport of the fastener through delivery guide 218 to delivery tube 220.

Fixed fastener delivery tube 222 extends from delivery guide 218 and is in communication with the flexible fastener delivery tube 224. For the moment ignoring staging mechanism 107, which will be described in detail below, a fastener dropped through delivery guide 218 is transported through fixed fastener delivery tube 222 by gravity until the fastener passes beyond a proximity sensor 228. When proximity sensor 228 detects the presence of a fastener, proximity sensor 228 notifies the control system, and the control system activates a pneumatic source (not shown). The pneumatic source provides pressurized air through the flexible fastener delivery tube 224 to deliver the fastener to an end 230 of flexible fastener delivery tube 224. An operator, installation tool, workstation, fastener bin, etc. may be coupled to end 230 of flexible fastener delivery tube 224.

Flexible fastener delivery tube 224 is flexible so that fasteners may be delivered to a plurality of locations throughout a manufacturing facility. Accordingly, the length of flexible fastener delivery tube 224 may be varied to accommodate the required distance from fastener delivery system 100 to the work station. Additionally, the inner diameter of the flexible fastener delivery tube 224 is larger than the diameter of a fastener head yet smaller than the overall length of the fastener to prevent tumbling. In some embodiments, flexible fastener delivery tube 224 is fabricated from relatively soft and flexible plastic such as nylon with a relatively smooth inner surface to minimize friction between the fastener and the inner wall of flexible fastener delivery tube 224.

Figure 3:
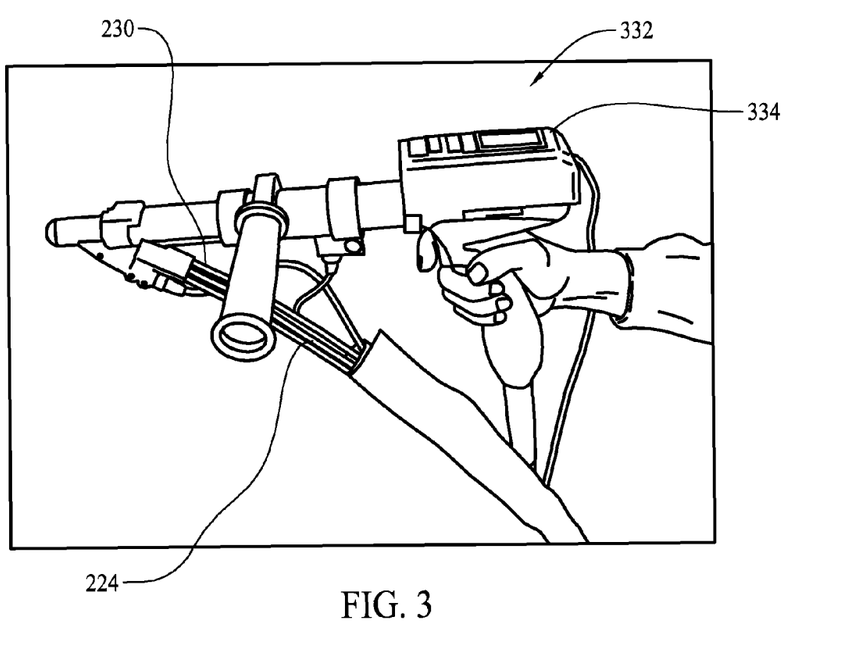
FIG. 3 is an illustration of an exemplary remote installation tool for receiving a fastener from the fastener delivery system shown in FIG. 1.

FIG. 3 illustrates an exemplary remote installation tool 332 for receiving a fastener via fastener delivery system 100. In the exemplary embodiment, end 230 of flexible fastener delivery tube 224 is coupled to remote installation tool 332. A fastener traveling through flexible fastener delivery tube 224 is delivered, at end 230, directly to remote installation tool 332. An operator (not shown) may then install the received fastener and request the next desired fastener.

In the exemplary embodiment, remote installation tool 332 includes a grip controller 334. Grip controller 334 is communicatively coupled to fastener delivery system 100. Grip controller 334 may be communicatively coupled to fastener delivery system 100 via a wired or wireless connection. An operator may request a particular fastener using grip by entering a request for the desired fastener on grip controller 334. Grip controller 334 transmits the request to fastener delivery system 100. Additionally, or alternatively, an operator may request a fastener directly from fastener delivery system 100 or using a different remote controller.

Figure 4:
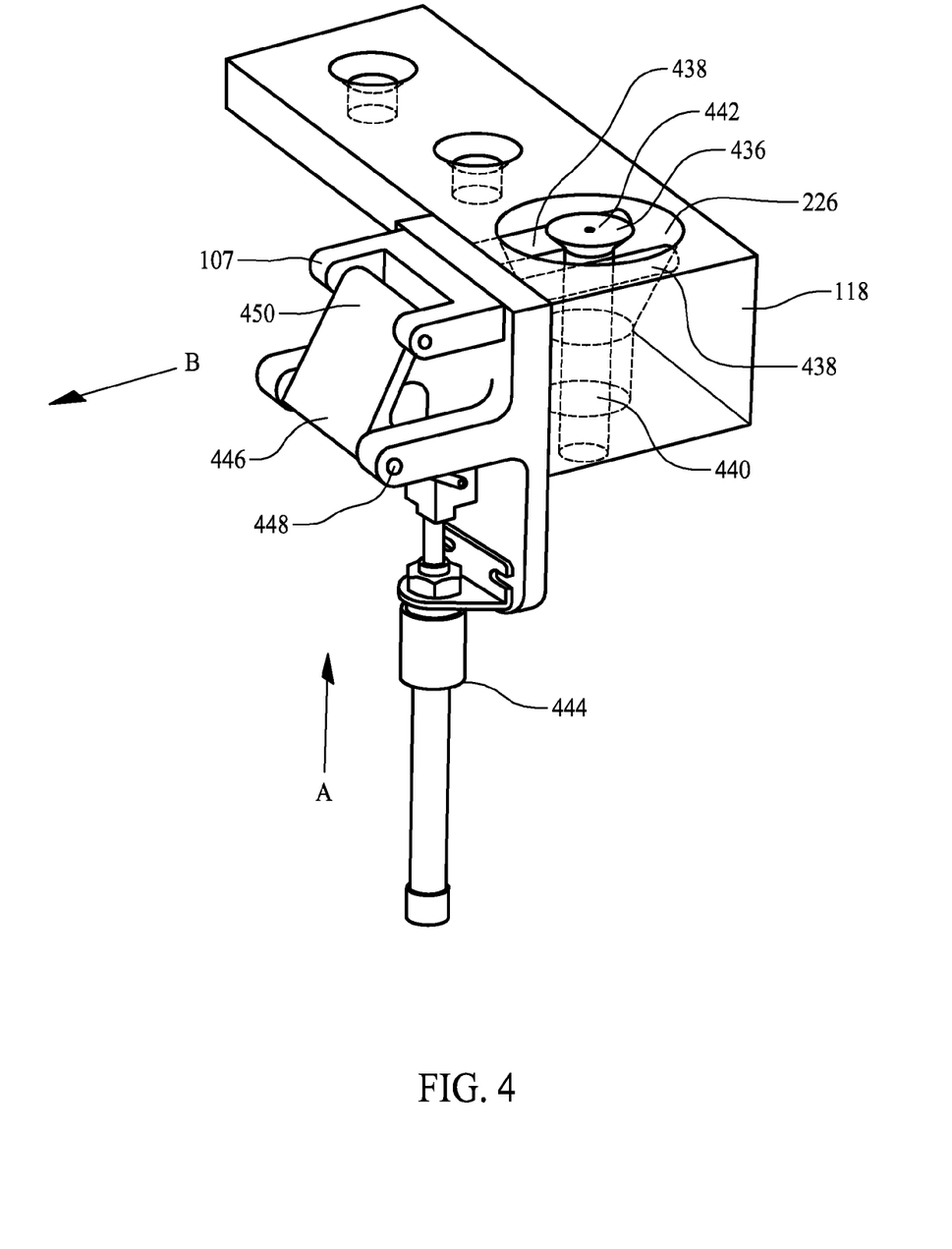
FIG. 4 is an isometric view of a delivery guide and a staging mechanism for use in the fastener delivery system shown in FIG. 1 to retain a fastener in a staged position.
Figure 5:
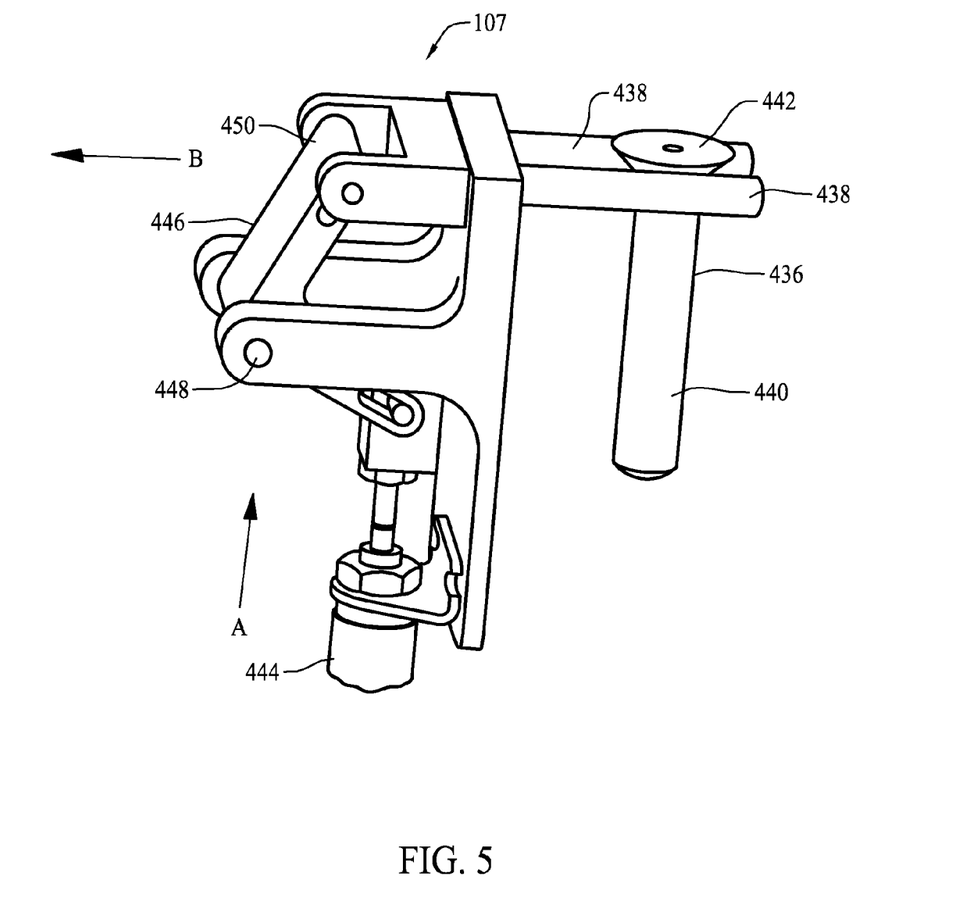
FIG. 5 is another isometric view the staging mechanism shown in FIG. 4 without the delivery guide.
Figure 6:
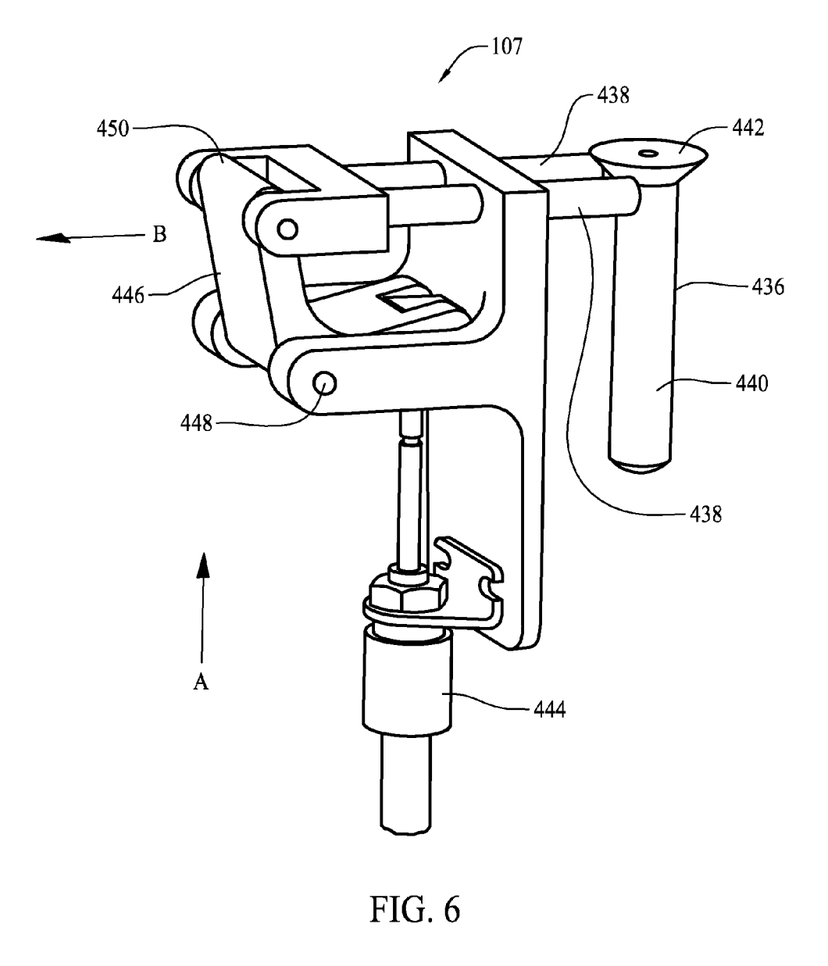
FIG. 6 is an isometric view of the staging mechanism shown in FIG. 5 with its retractable pins being retracted.

FIGS. 4-6 illustrate staging mechanism 107. More specifically, FIGS. 4 and 5 show staging mechanism 107 retaining a fastener 436 in a staged position, and FIG. 6 illustrates staging mechanism in the process of releasing fastener 436 for delivery to an operator. For clarity, delivery subsystem 106 is not shown in FIGS. 5 and 6, and delivery tube 220 is not shown in FIG. 4.

Staging mechanism 107 includes two retractable pins 438 for retaining fastener 436 in delivery guide 218. Retractable pins 438 are extendable generally parallel to one another through chute 226 of delivery guide 218. Retractable pins 438 are spaced apart from each other such that a shaft 440 of fastener 436 can pass between retractable pins 438 and a head 442 of fastener 436 cannot pass between retractable pins 438. Accordingly, when extractor tool 112 drops a fastener, such as fastener 436, into chute 226 of delivery guide 218 and retractable pins are extended, fastener 436 is caught by retractable pins 438 and retained within delivery guide 218. A fastener held in such position may be referred to as a staged fastener and/or a fastener held in a staging position. If retractable pins 438 are in a retracted position, and therefore do not extend through chute 226, when extractor tool 112 drops a fastener into chute 226, staging mechanism 107 does not affect the dropped fastener and the dropped fastener is delivered to a workstation as described above. Similarly, when it is desired to deliver a staged fastener, such as fastener 436, to a workstation, staging mechanism 107 retracts retractable pins 438 from chute 226, releasing fastener 436 to drop into delivery tube 220 for delivery to a workstation.

An actuator 444 is coupled to staging mechanism 107 to extend and retract retractable pins 438. When actuator is extended in direction A, it causes slotted crank 446 to pivot about a shaft 448. The pivoting causes a top portion 450 of slotted crank 446 to translate away from delivery guide 218 substantially in direction B. Because retractable pins 438 are coupled to top portion 450, the translation of top portion 450 causes retractable pins 438 to retract substantially in direction B. Similarly, when actuator 444 retracts (i.e., translates in the direction opposite direction A), slotted crank 446 pivots in the opposite direction and top portion 450 moves toward delivery guide 218, thereby extending retractable pins 438 into delivery guide 218.

Figure 7:
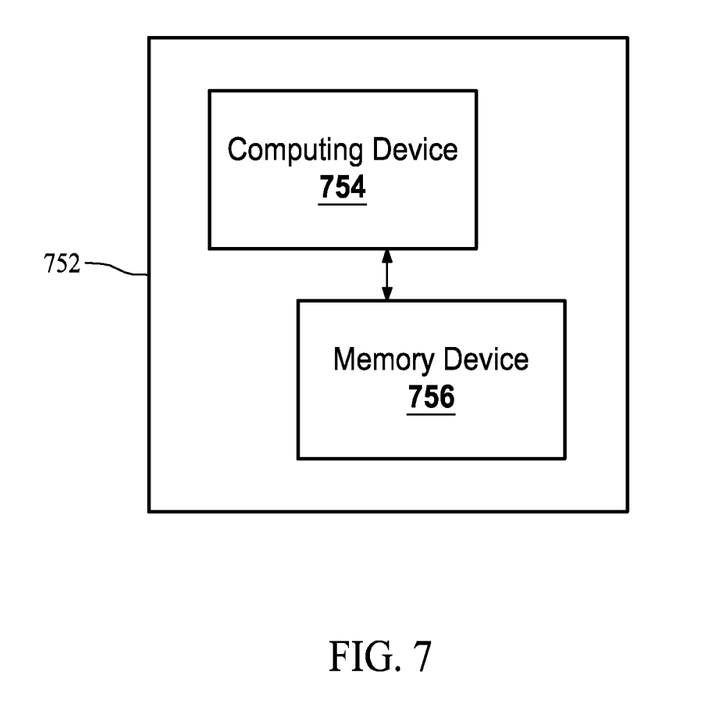
FIG. 7 is a block diagram of a control system for use with the fastener delivery system shown in FIG. 1.

FIG. 7 is a block diagram of a control system for use with fastener delivery system 100. Control system 752 generally comprises a computing device 754 (e.g., personal computer, programmable logic controller) and a memory device 756 in communication with computing device 754. Although illustrated separate from computing device 754, memory device may, additionally or alternatively, be part of computing device 754. Computing device is in communication with fastener delivery system 100, and specifically in communication with at least staging mechanism 107, linear X-Y positioner 116, and proximity sensor 228, in particular.

Computing device 754 executes control software stored in memory device 756. In the exemplary embodiment, the control software includes a database having system parameters and fastener parameters. The system parameters include for example, parameters for the fastener cassette 108 such as the position of each fastener storage tube 110, the fastener configuration in each tube, and the current number of fasteners in each tube. As the fastener delivery system 100 delivers fasteners, the control software maintains a real-time count of the fasteners remaining in the fastener cassette 108.

The fastener parameters include, for example, the fastener identification (e.g., ST3M760T 4-10, which is a 0.250" diameter hi-lok with a 0.625" grip length), and the fastener diameter and grip length. Additional fastener parameters may be employed depending on the type of fasteners and the configuration of the fastener delivery system 100.

Computing device 754 also executes staging software. The staging software includes instructions for staging fasteners utilizing staging mechanism 107. The staging software may be part of the control software or may be separate software. In some embodiments, staging software is run in parallel with control software.

Control system 752 further comprises associated electrical and pneumatic controls such as servo motors that activate the linear X-Y positioner 116, actuator 444, among others. The electrical and pneumatic controls are commonly known in the art and shall not be described in further detail herein for purposes of brevity. Additionally, the request for a specific fastener configuration from the devices as previously set forth may be through a hard-wired connection, radio frequency (RF) transmissions, optical signals, and voice-activated signals, among others known in the art.

In use, the computing device 754 generally receives a request for a specific fastener configuration from an input device such as grip controller 334, a grip length checker, a microphone, a computer operated pendant, a computer keyboard or touch screen, or a bar code reader or other auto identification system, among others, and activates the linear X-Y positioner 116 to move extractor system 104 adjacent the storage system 102. The computing device 754 then positions extractor tool 112 against fastener cassette 108 and activates vacuum generator 114 to remove a fastener, such as fastener 436, from the fastener cassette 108 as previously described.

Once the extractor system 104 has removed a fastener, the control system 752 activates linear X-Y positioner 116 to position extractor system 104 adjacent delivery subsystem 106. Extractor tool 112 is positioned against the delivery guide 218 and vacuum generator 114 is deactivated, thereby causing the fastener to drop into chute 226. When control system 752 is responding to a request for a particular fastener, control system 752 maintains staging mechanism 107 with pins 438 in the retracted position. The fastener passes through chute 226 and into delivery tube 220. Once the fastener passes beyond the proximity sensor 228, the control system 752 activates a pneumatic source to provide pressurized air to deliver the fastener to the work station.

After the fastener is released by extractor system 104, control system 752 begins staging a second fastener of the same type as was just delivered. Generally, the procedure discussed above is repeated. In this staging process, control system 752 utilizes staging mechanism 107 to prevent the second fastener from passing through chute 226. Specifically, control system 752 causes actuator 444 to retract, thereby extending retractable pins into chute 226 to catch the fastener. If the operator next requests the same type of fastener, control system 752, upon receiving the request, utilizes staging mechanism to release the staged fastener to pass through chute 226 to delivery tube 220 and the staging process may be repeated. Thus, by staging the fastener prior to receiving the operator's request, the time that would otherwise be required to retrieve the fastener from storage system 102 and transfer it to delivery subsystem system 106 in response to the operator's request is saved.

If instead of requesting the same type of fastener as the staged fastener, the operator requests a different type of fastener, control system 752 activates linear X-Y positioner 116 to position extractor system 104 adjacent delivery subsystem 106 (if necessary). Extractor tool 112 is positioned against the delivery guide 218 and vacuum generator 114 is activated, thereby retrieving the previously staged fastener from chute 226. Control system 752 activates the linear X-Y positioner 116 to move extractor system 104 adjacent the storage system 102. The computing device 754 then positions extractor tool 112 against fastener cassette 108 (and specifically adjacent the appropriate fastener storage tube 110) and deactivates vacuum generator 114 to return the fastener to the fastener cassette 108. Control system 752 is then able to retrieve the requested second type of fastener and transfer it to delivery subsystem 106 as described above.

Thus, exemplary embodiments may speed up delivery of fasteners from an automatic fastener delivery system by staging a second fastener for delivery before a request for the second fastener is received. In embodiments in which multiple operators each request fasteners from the same fastener delivery system, the time savings may be increased. Because a staged fastener can be delivered upon receipt of a request for the fastener, a first operator need not wait for the fastener delivery system to retrieve and deliver a fastener to a second operator before retrieving and delivering a fastener to the first operator. Accordingly, embodiments of fastener delivery systems may improve productivity and decrease cost associated with some assembly procedures.

Although the preceding paragraphs disclose a system for the delivery of fasteners, other types of components may also be removed and delivered according to the present teachings for a variety of applications. For example, the system may be employed to deliver detail parts for an assembly or even components for other applications such as food delivery, mail delivery, and a wide range of other applications. Accordingly, the delivery of fasteners for assembly operations shall not be construed as limiting the scope of the embodiments described herein.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for delivering fasteners to a remote installation tool, said method comprising:
   delivering a first fastener of a first type to a remote installation tool in response to receiving a request for a fastener of the first type from an operator;
   staging a second fastener of the first type for delivery to the remote installation tool, said staging beginning prior to receiving a request from the operator for another fastener of the first type, and said staging comprising:
   retrieving the second fastener of the first type from a storage location; and
   transferring the second fastener of the first type from the storage location to a staging location.

2. A method according to claim 1, further comprising returning the second fastener of the first type to the storage location in response to receiving a request for a fastener of a second type.

3. A method according to claim 1, wherein said delivering the first fastener of the first type comprises dropping the first fastener of the first type into a delivery guide coupled to a delivery tube, and wherein said staging the second fastener of the first type comprises dropping the second fastener of the first type into the delivery guide and retaining the second fastener of the first type in the delivery guide.

4. A method according to claim 3, wherein retaining the second fastener of the first type in the delivery guide comprises capturing a head of the second fastener of the first type between at least two retractable pins of a staging mechanism, deployed at the staging location.

5. A method according to claim 4, further comprising delivering the second fastener of the first type to the remote installation tool by retracting the at least two retractable pins to release the second fastener of the first type in response to receiving a request for the second fastener of the first type.

6. An apparatus for delivering fasteners to a remote installation tool, said apparatus comprising:
   a delivery tube coupleable to the remote installation tool;
   a delivery guide coupled to said delivery tube;
   a storage location configured to store a plurality of fasteners;
   an extraction device operable to transfer a fastener of the plurality of fasteners from said storage location to said delivery guide;
   a staging mechanism coupled to said delivery guide, said staging mechanism configured to selectively retain the fastener of the plurality of fasteners in said delivery guide or permit the fastener of the plurality of fasteners to pass through said delivery guide to said delivery tube; and
   a processor configured to:
      deliver a first fastener of a first type to the remote installation tool via said delivery guide and said delivery tube in response to receiving a request for the first fastener of the first type from an operator; and
      stage a second fastener of the first type in said delivery guide by transferring the second fastener of the first type from said storage location to said delivery guide, and selectively retaining the second fastener of the first type in said delivery guide using said staging mechanism.

7. An apparatus according to claim 6, wherein to deliver the first fastener of the first type, said processor is further programmed to:
   operate said extraction device to transfer the first fastener of the first type from said storage location to said delivery guide in response to receiving a request for the first fastener from an operator.

8. An apparatus according to claim 7, wherein said processor is further programmed to:
   operate said extraction device to begin to transfer the second fastener of the first type from said storage location to said delivery guide after transferring the first fastener of the first type and prior to receiving a request for the second fastener of the first type.

9. An apparatus according to claim 8, wherein said processor is further programmed to:
   retain the second fastener of the first type in said delivery guide using said staging mechanism; and
   operate said staging mechanism to release the second fastener of the first type to pass to said delivery tube in response to receiving a request for the second fastener of the first type.

10. An apparatus according to claim 9, wherein said processor is further programmed to:
    operate said extraction device to transfer the second fastener of the first type from said delivery guide to said storage location in response to receiving a request for a fastener of a second type.

11. An apparatus according to claim 6, wherein said staging mechanism comprises a plurality of pins extendable through said delivery guide to retain a fastener in said delivery guide.

12. An apparatus according to claim 11, wherein said staging mechanism comprises an actuator coupled to the pins, the actuator operable to extend the pins through said delivery guide to retain a fastener in said delivery guide and retract the pins from said delivery guide to permit a fastener to pass through said delivery guide to said delivery tube.

13. An apparatus according to claim 12, wherein the actuator is coupled to the pins via a slotted crank.

14. A fastener delivery and installation system comprising:
    a storage system configured to store a plurality of fasteners;
    an extractor configured to extract a fastener of the plurality of fasteners from said storage system;
    a delivery system comprising;
       a delivery guide configured to receive the fastener of the plurality of fasteners from said extractor;
       a delivery tube coupled to said delivery guide, said delivery tube configured to deliver the fastener of the plurality of fasteners to a remote installation tool; and
       a staging mechanism coupled to said delivery guide, said staging mechanism configured to selectively retain the fastener of the plurality of fasteners in said delivery guide or selectively permit the fastener of the plurality of fasteners to pass through said delivery guide to said delivery tube; and a processor configured to:
  operate said extractor to transfer the fastener of the plurality of fasteners from said storage system to said delivery system; and
  selectively operate said staging mechanism to retain the fastener of the plurality of fasteners in said delivery guide or permit the fastener of the plurality of fasteners to pass through said delivery guide to said delivery tube.

15. A system according to claim 14, wherein the staging mechanism includes a plurality of pins extendable through the delivery guide to retain a fastener in the delivery guide and retractable from the delivery guide to permit a fastener to pass through the delivery guide to the delivery tube.

16. A system according to claim 14, wherein said processor is programmed to:
  operate said extractor to transfer a requested fastener from said storage system to said delivery system in response to receiving an operator's request for the requested fastener;
  operate the staging mechanism to permit the requested fastener to pass through the delivery guide to the delivery tube.

17. A system according to claim 16, wherein said processor is programmed to:
  operate said extractor to transfer an additional fastener of a same type as the requested fastener from said storage system to said delivery system after the requested fastener has been transferred to said delivery system; and
  operate the staging mechanism to retain the additional fastener in the delivery guide.

18. A system according to claim 17, wherein said processor is programmed to:
  operate the staging mechanism to permit the additional fastener to pass through the delivery guide to the delivery tube if the operator requests the additional fastener; and
  operate said extractor to transfer the additional fastener from said delivery system to said storage system if the operator requests a fastener other than the additional fastener.

19. An apparatus for delivering fasteners to a remote installation tool, said apparatus comprising:
  a delivery tube coupleable to the remote installation tool;
  a delivery guide coupled to said delivery tube;
  a storage location configured to store a fastener;
  an extraction device configured to transfer the fastener from said storage location to said delivery guide; and
  a staging mechanism coupled to said delivery guide, said staging mechanism comprising a plurality of pins selectively extendable through said delivery guide to retain the fastener in said delivery guide or selectively retractable from said delivery guide to permit the fastener to pass through said delivery guide to said delivery tube.

20. A fastener delivery and installation system comprising:
  a storage system configured to store a fastener;
  an extractor configured to extract the fastener from said storage system; and
  a delivery system comprising:
    a delivery guide configured to receive the fastener from said extractor;
    a delivery tube coupled to said delivery guide, said delivery tube configured to deliver the fastener to the remote installation tool; and
    a staging mechanism coupled to said delivery guide, said staging mechanism comprising a plurality of pins selectively extendable through said delivery guide to retain the fastener in said delivery guide or selectively retractable from said delivery guide to permit the fastener to pass through said delivery guide to said delivery tube.

* * * * *